US007853771B2

(12) United States Patent  
Declercq et al.

(10) Patent No.: US 7,853,771 B2  
(45) Date of Patent: Dec. 14, 2010

(54) PAGE ALLOCATION MANAGEMENT FOR VIRTUAL MEMORY

(75) Inventors: Andrew James Declercq, Austin, TX (US); Andrew Dunshea, Austin, TX (US); Matthew John Harding, Philadelphia, PA (US); Zachary Merlynn Loafman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1239 days.

(21) Appl. No.: 11/104,044

(22) Filed: Apr. 12, 2005

(65) Prior Publication Data

US 2006/0230247 A1 Oct. 12, 2006

(51) Int. Cl.
G06F 12/00 (2006.01)
G06F 13/00 (2006.01)
G06F 13/28 (2006.01)
(52) U.S. Cl. ...................................................... 711/171
(58) Field of Classification Search ................. 707/205; 711/153

See application file for complete search history.

(56) References Cited

U.S. PATENT DOCUMENTS 5,802,341 A * 9/1998 Kline et al. ................. 711/209
6,119,214 A 9/2000 Dirks 2002/0147733 A1* 10/2002 Gold et al. .................. 707/200
2006/0129780 A1* 6/2006 Dunshea et al. ............. 711/170

OTHER PUBLICATIONS

IBM, Distinguishing Between Short Term and Long Term Pins of Pages In Virtual Memory During I/O, Nov. 1, 1986, IBM Technical Disclosure Bulletin, Nov. 1986, pp. 2689-2690.*
U.S. Appl. No. 11/011,243, filed Dec. 14, 2004, entitled, "Memory Pacing", Inventor: Andrew Dunshea, et al.
U.S. Appl. No. 10/286,532, filed Oct. 31, 2002, entitled, "System and Method for Preferred Memory Affinity", Inventor: Jos Accapadi, et al.
U.S. Appl. No. 10/828,455, filed Apr. 20, 2003, entitled, "System and Method for Dynamically Adjusting Read Ahead Values Based Upon Memory Usage", Inventor: Jos Accapadi, et al.

* cited by examiner

*Primary Examiner*—Kevin L Ellis
*Assistant Examiner*—Chad L Davidson
(74) *Attorney, Agent, or Firm*—Dillon & Yudell LLP

(57) ABSTRACT

A method, system, device, and article of manufacture for use in a computer memory system utilizing multiple page types, for handling a memory resource request. In a accordance with the method of the invention, a request is received for allocation of pages having a first page type. The first page type has a specified allocation limit. A determination is made in response to the page allocation request of whether the number of allocated pages of the first page type exceeds or is below the allocation limit. In response to determining that the number of allocated pages of said first page type is below the allocation limit, the virtual memory manager enables allocation of pages for the request to exceed the allocation limit.

20 Claims, 2 Drawing Sheets

PAGE ALLOCATION MANAGEMENT FOR VIRTUAL MEMORY

BACKGROUND OF THE INVENTION

1. Technical Field

The present invention relates generally to management of computer memory resources, and in particular, to allocation of virtual memory pages. More particularly, the present invention relates to a system and method for managing page allocation in accordance with page type allocation limits.

2. Description of the Related Art

Virtual memory is a critical feature supported by most modern operating systems in conjunction with memory management hardware. Virtual memory essentially provides an alternate set of memory addresses. Programs use these virtual addresses rather than real addresses to store instructions and data. When called by program threads, the virtual addresses are converted into physical or real memory addresses.

The basic purpose of virtual memory is to enlarge the address space comprising the set of addresses a program can utilize. For example, virtual memory might contain twice as many addresses as main memory. A program using all of virtual memory, therefore, would not be able to fit in main memory all at once. Nevertheless, the computer could execute such a program by copying into real memory those portions of the program needed at any given point during program execution.

To facilitate copying virtual memory into real memory, the operating system divides virtual memory into pages, each of which contains a fixed number of addresses. Each page is stored on a disk until it is needed. When the page is needed, the operating system copies it from disk to main memory, translating the virtual addresses into real memory addresses.

In addition to increasing the effective size of memory, virtual memory substantially improves the efficiency of physical memory utilization for processing environments in which ranges of addresses are allocated per program/thread. Specifically, physical addresses only need to be assigned to those logical addresses that are currently active (i.e. not free). If a program is not using a portion of its assigned address space, no physical addresses need be reserved for these unused logical addresses. As a result, a larger portion of main memory is available for use by other programs which can continue to operate as if they have a large contiguous available address space.

While virtual memory improves the sharing of physical memory among threads, other problems relating to efficient physical memory utilization remain unresolved by conventional virtual memory systems. One such problem relates to page allocation in a virtual memory system that utilizes multiple page types.

In many operating systems, such as IBM's AIX® operating system, the page allocation function is performed by a virtual memory manager which services memory requests from the operating system including memory requests originating from application programs. The virtual memory manager manages the allocation of page frames as well as resolving references to virtual memory pages that are not currently in real memory or do not yet exist. To these ends, the virtual memory manager maintains a "free list" of available page frames and uses a page-replacement algorithm such as Least Recently Used (LRU) to determine which pages that are currently in real memory will have their page frames reassigned to the free list (i.e., swapped out).

The page allocation algorithm used by a virtual memory manager typically accounts for the distinction between page types, i.e. pages that are "persistent" versus those that are "working storage pages." As the name implies, persistent memory pages, referred to alternatively herein as "file pages," have permanent storage locations on disk. Data files and executable programs are typically mapped to persistent storage pages. On the other hand, working storage pages are transitory and exist only during their use by a program. Working pages have no permanent disk storage location, and when paged out or "swapped," they are written to disk paging space.

In order to maintain a desired level of input/output (I/O) performance, most virtual memory managers implement page allocation limits for the respective persistent and working page types. Hard limits may be used, for example, to maintain a specified limit on the amount of real memory page frames to be allocated to file pages and/or the amount to be reserved for working storage pages. A hard limit requires that a page replacement be performed when the specified limit threshold is reached for a requested page type even if memory is otherwise available. Many virtual memory managers utilize so-called soft limits which, like hard limits, assign threshold allocation limits to each respective page type. As the name implies, however, soft limits are not enforced as absolute limits on memory allocation for a specified page type but instead are utilized as a page replacement prioritization policy. Namely, each page type is allowed to exceed its assigned threshold such that page replacement is never required while memory is free for at least one of the page types. Upon exhaustion of available page frames, the soft limits then provide the victim selection criteria for pushing limit violators back down during subsequent page replacements.

Hard limits ensure a specified relative allocation between file and working pages. However, such inflexible limits often result in additional overhead processing required for page swapping and fragmented I/O even when some portion of real memory is free. In the absence of hard limits, or when using soft limits that permit all memory to be utilized regardless of the page type of any given request, memory will be exhausted at high utilization periods when demand exceeds the available free list. Such a condition is undesirable particularly considering the unequal penalties associated with replacement of different page types.

From the foregoing, it can be appreciated that a need exists for an improved virtual memory page allocation method and system that addresses the foregoing problems and other needs unresolved by the prior art.

SUMMARY OF THE INVENTION

A method, system, device, and article of manufacture for use in a computer memory system utilizing multiple page types, for handling a memory resource request are disclosed herein. In a accordance with the method of the invention, a request is received for allocation of pages having a first page type. The first page type has a specified allocation limit. A determination is made in response to the page allocation request of whether the number of allocated pages of the first page type exceeds or is below the allocation limit. In response to determining that the number of allocated pages of said first page type is below the allocation limit, the virtual memory manager enables allocation of pages for the request to exceed the allocation limit.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
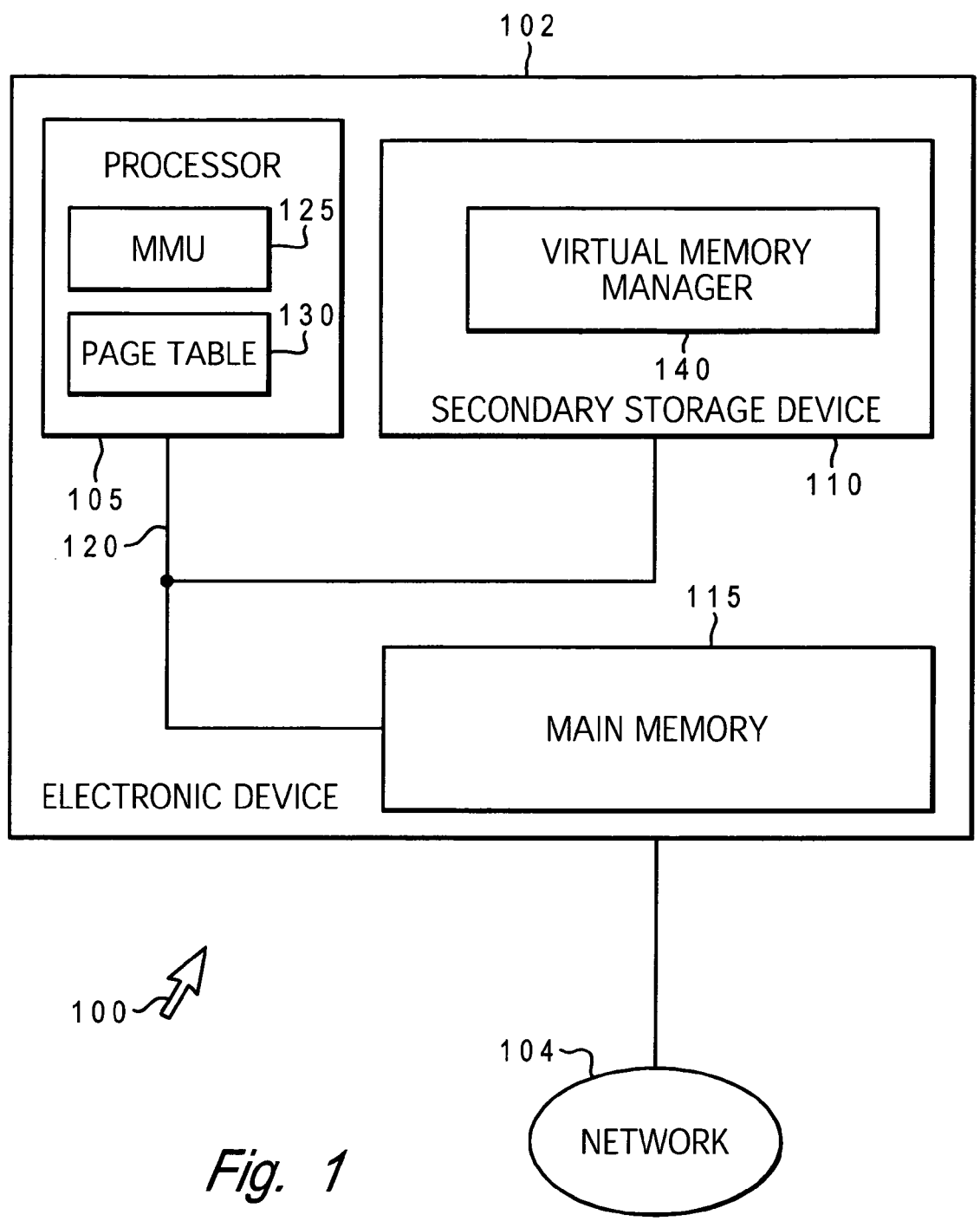
FIG. 1 depicts a block diagram of a data processing system adapted to implement an embodiment of the invention.

With reference now to the figures, wherein like reference numerals refer to like and corresponding parts throughout, and in particular with reference to FIG. 1, there is depicted a data processing system adapted for implementing the present invention. For discussion purposes, the data processing system is described as a multi-processor computer system, such as may be used for large-scale server/storage applications. However, as used herein, the terms "data processing system," "computer," and the like, are intended to mean essentially any type of computing device or machine that is capable of running a software product. Data processing system 100 includes an electronic device 102 communicatively coupled to a network 104. Although only one electronic device 102 and one network 104 are shown, in other embodiments any number or combination of them may be present.

Electronic device 102 includes a processor 105 connected to a secondary storage device 110 and a main memory 115 via an interconnect 120 which may comprise any combination of one or more shared busses or switched connections. Processor 105 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 105 executes instructions and includes that portion of electronic device 102 that controls overall operation of the device. In support of its control function, processor 105 reads and/or stores code and data to/from secondary storage device 110 and/or main memory 115.

Processor 105 includes a memory management unit (MMU) 125 that accesses a page table 130. Memory management unit 125 is typically a hardware component, and includes executable instructions for managing virtual memory within electronic device 102. Memory management unit 125 maps virtual memory addresses to physical memory addresses using page table 130. The functions of the memory management unit 125 are further described below with reference to FIG. 2. Although memory management unit 125 is depicted within the block representing processor 105, in another embodiment the memory management unit 125 may be implemented fully or partially outside processor 105. Although the page table 130 is drawn as being included in memory resident within processor 105, in another embodiment, the page table 130 may be separate from the processor 105. For example, page table 130 may be included within main memory 115.

Although not depicted in FIG. 1, processor 105 may include a variety of other elements not necessary to understanding the present invention. For example, processor 105 may typically include a variety of execution units for executing instructions during a processor cycle, a bus interface unit for interfacing to the bus 120, a fetcher for fetching instructions, and queues and/or caches for holding instructions and data. In other embodiments, processor 105 includes other appropriate elements well known to those skilled in the art.

Although electronic device 102 is shown to contain only a single processor 105 and a single bus 120, the present invention applies equally to electronic devices that may have multiple processors and multiple buses with some or all performing different functions in different ways.

Secondary storage device 110 represents one or more mechanisms for storing data. For example, the secondary storage device 110 may include random access memory (RAM), magnetic disk storage media, optical storage media, flash memory devices, and/or other machine-readable media. In other embodiments, any appropriate type of storage device may be included within secondary storage device 110. Although only one secondary storage device 110 is shown, multiple storage devices and multiple types and levels of storage devices may be present. Further, although electronic device 102 is drawn to contain the secondary storage device 110, it may be distributed across other electronic devices, for example when electronic devices are connected in a network, such as network 104.

Secondary storage device 110 includes a virtual memory manager 140. Virtual memory manager 140 includes electronic or software encoded instructions capable of being executed by the processor 105 and/or statements capable of being interpreted by instructions that execute on processor 105 in performing memory allocation management as described below with reference to FIG. 2. In one embodiment, some or all of the functions of virtual memory manager 140 may be implemented via logic gates and/or other hardware mechanisms. Virtual memory manager 140 may perform paging functions to move pages (including itself) between the secondary storage device 110 and the main memory 115. The functions of the virtual memory manager 140 are further described below with reference to FIG. 2.

Main memory 115 represents one or more mechanisms for storing data. For example, main memory 115 may include a cache or caches or random access memory of any appropriate type. Although only one main memory 115 is shown, multiple memories and multiple types and levels of memory may be present. In an embodiment, main memory 115 is smaller with a faster access time than secondary storage device 110.

Interconnect 120 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

Electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

Network 104 may be any suitable network or combination of networks and may support any appropriate protocol suitable for communication of data and/or code to/from electronic device 102. In various embodiments, network 104 may include a storage device or a combination of storage devices, either directly or indirectly connected to the electronic device 102.

As will be described in detail below, aspects of an embodiment of the invention pertain to specific apparatus and method elements implemented on a computer, processor, or other electronic device. In another embodiment, the invention may be implemented as a program product for use with a computer, processor, or other electronic device. The executable instructions defining the functions of this embodiment may be performed by electronic hardware and/or may be delivered to the computer, processor, or other electronic device via a variety of signal-bearing media, which include, but are not limited to:

(1) information permanently stored on a non-rewriteable storage medium, e.g., a read-only memory device attached to or within a computer, processor, or other electronic device, such as a CD-ROM readable by a CD-ROM drive;

(2) alterable information stored on a rewriteable storage medium, e.g., a hard disk drive or diskette; or (3) information conveyed to a computer, processor, or other electronic device by a communications medium, such as through a computer or a telephone network, e.g., the network 104, including wireless communications.

Such signal-bearing media, when carrying machine-readable instructions that direct the functions of the present invention, represent embodiments of the present invention.

In accordance with the present invention, electronic device 102 includes an operating system (not shown), such as IBM's AIX®, that supports virtual memory in conjunction with the functionality provided by memory management unit 125 and virtual memory manager 140. As is well understood in the art, virtual memory essentially provides an alternate set of memory addresses, referred to as virtual addresses. Programs use the virtual addresses rather than real addresses (i.e. physical addresses in main memory 115) to store instructions and data. During program thread execution, the virtual addresses are converted into the corresponding physical memory addresses.

To facilitate copying virtual memory into real memory, the operating system divides virtual memory into pages, each of which has traditionally contained a fixed number of addresses. Each page is stored on a disk until it is needed. When the page is needed, the operating system copies it from disk to main memory, translating the virtual addresses into real addresses. The process of translating virtual addresses into real addresses is called mapping. The copying of virtual pages from disk to main memory is known as paging. In AIX®, for example, virtual memory segments are partitioned into 4 k (4096) byte page units and real memory is divided into 4 k-byte page frames.

As described in further detail below with reference to FIG. 2, the present invention is directed to managing page allocation in a virtual memory system such as that included in data processing system 100. More specifically, the memory/page frame allocation management of the invention utilizes a semi-soft allocation limit assigned to at least one of multiple page types used by the virtual memory system. As utilized herein page "type" may refer to the type of data stored in a particular file. In a preferred embodiment, page type refers to the distinction between persistent storage pages and working storage pages.

Figure 2:
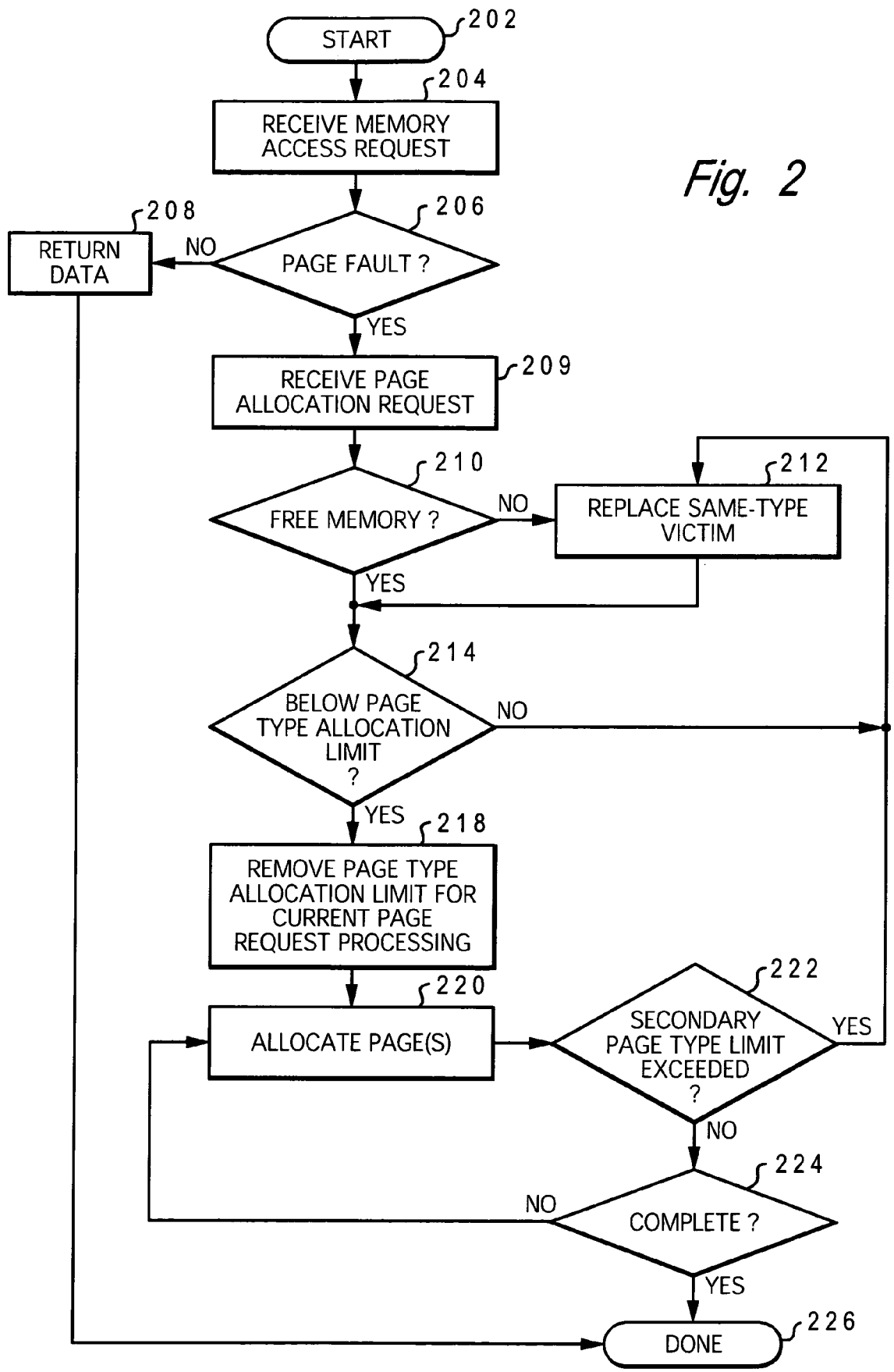
FIG. 2 is a high-level flow diagram illustrating steps performed during memory allocation management in accordance with the present invention.

Referring to FIG. 2, there is depicted a high-level flow diagram illustrating steps performed by a data processing system, such as data processing system 100, during page allocation management in accordance with the present invention. As shown in FIG. 2, the process begins as depicted at steps 202 and 204 with a memory access request such as a read request received by the memory access processing components of main memory 115. If the requested data is currently in main memory 115, the data is returned to the requesting thread and the process terminates as shown at steps 206, 208, and 226.

If, however, a lookup directory reveals that the requested data is not currently in physical memory (i.e. main memory 115) a page fault occurs (step 206) in which an interrupt is issued, which in turn prompts the operating system to fetch the data from the alternate storage area, such as in secondary storage device 110, and load it to into main memory 115. A page allocation request is generated and received (step 209) in response to the page fault. Processing of the page fault may require that memory space be freed if all memory is currently occupied at the time of the page fault. If, as illustrated at steps 210 and 212, such a condition exists in which there is no free memory to service the page fault, a page replacement (sometimes referred to as a page swap or page out) operation is required. In one embodiment, and as explained in further detail below, the "victim" segment that is to be copied back to secondary storage device 110, may be the same page type as the page type of the pages to be allocated in response to the page fault depending on the current allocation level of the requested page type.

Proceeding to inquiry step 214, in either the case that free memory is available, such as may be accessible from free lists accessed by virtual memory manager 140, or a page replacement is required to free up memory, virtual memory manager 140 determines whether or not the current allocation of page frames to pages of the requested page type is below a specified allocation limit assigned to that particular page type. The allocation limit is expressed as some interpretable metric against which current memory allocation can be compared to determine whether the current allocation of the corresponding page type is above, at, or below the specified limit. In one embodiment, the allocation limit is represented as a number of pages. In an alternate embodiment, the allocation limit is represented as a percent of memory capacity. In still another embodiment, the allocation limit may be represented as a specified ratio of the page type in question to the current allocation of pages for one or more other page types. If the current allocation of page frames of the requested page type is determined by virtual memory manager 140 to be at or exceed the limit assigned to that page type, the limit is enforced as shown at step 212 with the replacement of one or more pages of the same type as that requested. For example, if the page fault required persistent storage pages, the victim swapped from main memory 115 (i.e. copied from main memory 115 to the alternate page storage space in secondary storage device 110) responsive to a determination that the allocation limit has been exceeded would be one or more persistent storage pages.

As illustrated at step 218, in response to determining that allocation of the requested page type is below the corresponding page-type-specific limit, virtual memory manager 140 begins allocating pages for the allocation request at step 220 without regard for the allocation limit, enabling allocation of pages to exceed the allocation limit. In this manner, and for a given page allocation request, the first time the allocation of the requested page type is determined to be in compliance with the specified allocation limit, the limit is effectively removed for subsequent processing of that request. Having satisfied the condition illustrated at step 214 once, either initially or following a page replacement, pages are allocated (step 220) until the entire I/O request depicted at step 209 is satisfied. In an alternate embodiment, a second allocation limit that is higher than the original limit may be utilized to prevent excessive creep from the desired allocation limit. In this case, as shown at steps 222 and 212, if the second limit is exceeded during page allocation, the original allocation limit is enforced and the processing of the memory access request concludes as shown at step 226.

It should be noted that the embodiment depicted in FIG. 2 may be practiced in a computer memory system employing a single page type. In this embodiment, memory stealing occurs automatically to bring the currently allocated memory to the first allocation limit independently of other, possibly concurrent requests for memory allocation.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. In a computer memory system utilizing multiple virtual memory page types, a method for handling a memory resource request comprising:

receiving a request at a memory device for virtual memory pages having a first page type, said memory device having a first allocation limit specified for said first page type;

responsive to said request, determining whether a number of pages allocated to said first page type in said memory device is below said first allocation limit; and responsive to determining that the number of pages allocated to said first page type in said memory device is below said first allocation limit, enabling allocation of pages for said request to exceed said first allocation limit within said memory device.

2. The method of claim 1, further comprising, responsive to determining that the number of pages allocated to said first page type within said memory device exceeds said first allocation limit, applying said first allocation limit to allocation of pages for said request such that page replacement of pages having said first page type is required for processing said request.

3. The method of claim 1, wherein said determining step comprises comparing said first allocation limit to an amount of the memory currently allocated to said first page type within said memory device.

4. The method of claim 1, wherein said receiving a request for pages having a first page type is performed responsive to a page fault.

5. The method of claim 1, wherein the multiple virtual memory page types include persistent storage pages and working storage pages.

6. The method of claim 1, wherein each of the multiple virtual memory page types has an associated allocation limit.

7. The method of claim 1, wherein said determining that the number of pages allocated to said first page type within said memory device is below said first allocation limit is followed by:

allocating free page frames for said request; and during said allocating step and responsive to the page frames allocated for said first page type exceeding a second allocation limit, applying said first allocation limit to subsequent page allocation for said request.

8. A computer memory system that supports virtual memory having multiple virtual memory page types, said computer memory system comprising:

means for receiving a request at a memory device for virtual memory pages having a first page type, said memory device having a first allocation limit specified for said first page type;

means, responsive to said request, for determining whether a number of pages allocated to said first page type within said memory device is below said first allocation limit; and means, responsive to determining that the number of pages allocated to said first page type within said memory device is below said first allocation limit, for enabling allocation of pages for said request to exceed said first allocation limit within said memory device.

9. The computer memory system of claim 8, further comprising means, responsive to determining that the number of pages allocated to said first page type within said memory device exceeds said first allocation limit, for applying said first allocation limit to allocation of pages for said request such that page replacement of pages having said first page type is required for processing said request.

10. The computer memory system of claim 8, wherein said means for determining comprises means for comparing said first allocation limit to an amount of the memory within said memory device currently allocated to said first page type.

11. The computer memory system of claim 8, wherein the multiple virtual memory page types include persistent storage pages and working storage pages.

12. The computer memory system of claim 8, wherein each of the multiple virtual memory page types has an associated allocation limit.

13. The computer memory system of claim 8, further comprising:

means for allocating page frames for said request; and means for, during said allocating step and responsive to the page frames allocated for said first page type exceeding a second allocation limit, applying said first allocation limit to subsequent page allocation for said request.

14. A tangible computer-readable data storage medium having encoding thereon computer-executable instructions for handling a memory resource request in a computer memory system utilizing multiple virtual memory page types, said computer-executable instructions performing a method comprising:

receiving a request at a memory device for virtual memory pages having a first page type, said memory device having a first allocation limit specified for said first page type;

responsive to said request, determining whether a number of pages allocated to said first page type within said memory device is below said first allocation limit; and responsive to determining that the number of pages allocated to said first page type within said memory device is below said first allocation limit, enabling allocation of pages for said request to exceed said first allocation limit within said memory device.

15. The computer-readable data storage medium of claim 14, wherein the method further comprises, responsive to determining that the number of pages allocated to said first page type within said memory device exceeds said first allocation limit, applying said first allocation limit to allocation of pages for said request such that page replacement of pages having said first page type is required for processing said request.

16. The computer-readable data storage medium of claim 14, wherein said determining step comprises comparing said first allocation limit to an amount of the memory within said memory device currently allocated to said first page type.

17. The computer-readable data storage medium of claim 14, wherein said receiving a request for pages having a first page type is performed responsive to a page fault.

18. The computer-readable data storage medium of claim 14, wherein the multiple virtual memory page types include persistent storage pages and working storage pages.

19. The computer-readable data storage medium of claim 14, wherein each of the multiple virtual memory page types has an associated allocation limit.

20. The computer-readable data storage medium of claim 14, wherein said determining that the number of allocated pages of said first page type is below said first allocation limit is followed by:
 allocating page frames for said request; and
 during said allocating step and responsive to the page frames allocated for said first page type exceeding a second allocation limit, applying said first allocation limit to subsequent page allocation for said request.

* * * * *